United States Patent
Matsuoka et al.

(10) Patent No.: US 7,771,859 B2
(45) Date of Patent: Aug. 10, 2010

(54) FUEL CELL

(75) Inventors: Koji Matsuoka, Gunma (JP); Takaaki Taniguchi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 566 days.

(21) Appl. No.: 11/711,633

(22) Filed: Feb. 28, 2007

(65) Prior Publication Data

US 2007/0202386 A1     Aug. 30, 2007

(30) Foreign Application Priority Data

Feb. 28, 2006   (JP) ............................ 2006-053417

(51) Int. Cl.
*H01M 4/00* (2006.01)
*H01M 2/00* (2006.01)
*H01M 8/18* (2006.01)

(52) U.S. Cl. .............................. 429/40; 429/19; 429/34; 429/44

(58) Field of Classification Search ................. None
See application file for complete search history.

(56) References Cited

FOREIGN PATENT DOCUMENTS

JP          2004-185830 A        7/2004

OTHER PUBLICATIONS

A.J. Bard et al, "Standard Potential in Aqueous Solution," Marcel Dekker (1985), p. 479.
Chinese Office Action, with English translation thereof, issued in Patent Application No. 200710084215.6 dated on Jul. 4, 2008.
T. Ioroi et al., Platinum and molybdenum oxide deposited carbon electrocatalyst for oxidation of hydrogen containing carbon monoxide, Electrochemistry Communications 4, Dec. 31, 2002, 442-446, Elsevier Science B.V., Osaka, Japan.

*Primary Examiner*—Melvin C Mayes
*Assistant Examiner*—Sarah Van Oudenaren
(74) *Attorney, Agent, or Firm*—McDermott Will & Emery LLP

(57) ABSTRACT

A fuel cell includes an electrolyte layer, a first electrode which is provided on one surface of the electrolyte layer and to which fuel is supplied, and a second electrode which is provided on the other surface of the electrolyte layer and to which an oxidant is supplied. The first electrode contains an additive having an oxidation-reduction potential which is higher than a potential of formation reaction for forming a proton from the fuel and which is lower than an oxidation potential of a component contained in the first electrode.

4 Claims, 7 Drawing Sheets

FUEL CELL

BACKGROUND OF THE INVENTION

1. Field of the Invention

The present invention relates to a fuel cell. In particular, the invention relates to a fuel cell in which the dissolution of a catalyst or the like due to fuel starvation at an anode is suppressed.

2. Description of the Related Art

In this age, new technologies such as IT and biotechnology have evolved globally. Even in such circumstances, the energy industry remains as one of the largest basic industries in the world. In recent years, as environmental awareness including prevention of global warming has grown, the expectations regarding so-called new energy have increased. New energy has advantages in terms of environmental friendliness, minimization of power transmission loss and increased security of power supply as the energy can be produced in dispersed localized sites close to electrical power consumers. Furthermore, the development of new energy is expected to create new related industries as a spin off. Efforts for the development of new energy began in the early 1970s, triggered by the oil crisis. At present, the following types of energy are under development for practical use: reproducible energy produced by solar photovoltaic power generation and the like, recycled energy produced by waste power generation and the like, high efficiency energy produced by a fuel cell and the like, and energy use in new fields, typified by a clean energy car.

Among these, the energy produced by a fuel cell is one of the types of energy receiving the most attention from industries. A fuel cell generates electricity and heat simultaneously through the chemical reaction of atmospheric oxygen with hydrogen produced through the reaction of water vapor with natural gas, methanol, or the like and thus produces only water as a by-product of power generation. In addition to this, high power generation efficiency is obtained even in a low output power range, and electrical power generation is not affected by weather and thus is stable. In particular, a polymer electrolyte fuel cell has received attention as one of the next-generation standard power sources in applications such as vehicle-mounted use, mobile use, and stationary use in homes and the like. (See, for example, Japanese Patent Laid-Open Publication No. 2004-185830.)

As described above, residential power source system having a polymer electrolyte fuel cell, hydrogen (theoretically, a gas mixture of approximately 80% hydrogen and approximately 20% carbon dioxide) produced through the reaction of water vapor with natural gas or methanol is supplied to an anode. In a vehicle-mounted fuel cell system serving as a driving source for an automobile, pure hydrogen (almost 100%) stored in a hydrogen tank is supplied to an anode. Furthermore, in a power source system for mobile devices such as notebook personal computers and cellular phones, alcohol-based liquid fuel such as methanol is supplied to an anode. When such a fuel is sufficiently supplied to an anode and contributes to power generation, an anode reaction represented by equation (1) or (2) occurs, and protons ($H^+$) move toward a cathode through an electrolyte layer.

$$H_2 \rightarrow 2H^+ + 2e^- \tag{1}$$

$$CH_3OH + H_2O \rightarrow 6H^+ + 6e^- + CO_2 \tag{2}$$

However, when a load is increased abruptly or when the concentration of the fuel decreases, so-called fuel starvation occurs in which the amount of fuel required at the anode during power generation becomes insufficient. In such a case, for example, carbon (C) in a catalyst-supporting carbon medium reacts with water ($H_2O$) at the anode (and occasionally, also at the cathode) to produce protons ($H^+$) as represented by equations (3) and (4), and thus a problem arises in that the carbon (C) is released as carbon dioxide ($CO_2$). Furthermore, when the catalyst for the anode contains ruthenium (Ru), the reaction represented by equation (5) occurs, and thus a problem arises in that the ruthenium (Ru) is oxidized and dissolved as ruthenium oxide ($RuO_2$). When the carbon (C) in the catalyst-supporting carbon medium is released, the supported catalyst (being Pt, Ru, or the like) is no longer supported, and thus the amount of the catalyst in the anode decreases. Furthermore, when the ruthenium (Ru) is oxidized and dissolved, a problem arises in that CO resistance is reduced.

$$C + H_2O \rightarrow CO + 2H^+ + 2e^- \tag{3}$$

$$C + 2H_2O \rightarrow CO_2 + 4H^+ + 4e^- \tag{4}$$

$$Ru + 2H_2O \rightarrow RuO_2 + 4H^+ + 4e^- \tag{5}$$

SUMMARY OF THE INVENTION

The present invention has been developed in view of the aforementioned problems, and a general purpose thereof is to provide a fuel cell in which the dissolution of a catalyst or the like due to fuel starvation at an anode is suppressed.

In order to achieve the foregoing general purpose, one embodiment of the present invention provides a fuel cell, comprising: an electrolyte layer; a first electrode which is provided on one surface of the electrolyte layer and to which fuel is supplied; and a second electrode which is provided on the other surface of the electrolyte layer and to which an oxidant is supplied. The first electrode contains an additive having an oxidation-reduction potential which is higher than a potential of formation reaction for forming a proton from the fuel and which is lower than an oxidation potential of a component contained in the first electrode.

Examples of the fuel include pure hydrogen and a reformed gas which is produced by reforming city gas, liquefied natural gas, or the like and contains approximately 80% of hydrogen. In addition to this, when the fuel cell is of a type to which organic fuel such as methanol is directly supplied, the organic fuel itself, an aqueous solution thereof, or the like, can be used as the fuel. Furthermore, the potential at which a proton is formed from the fuel depends on the fuel employed and the action of the catalyst, such as Pt, contained in the first electrode and falls within the range of –0.10 V to 0.25 V. The abovementioned additive is added to suppress the dissolution of the catalyst or the like, a process which takes place when fuel starvation occurs at the first electrode. It is desirable that the additive do not inhibit the reaction for producing a proton from the fuel. In addition to this, when fuel starvation occurs at the first electrode, a component such as the carbon supporting the catalyst, constituting the first electrode may be oxidized. In order to prevent the dissolution of the catalyst and the like, it is desirable that the additive be oxidized or reduced, instead of the above component at a potential lower than the potential at which the component is oxidized. As described above, in this embodiment, the first electrode contains an additive having an oxidation-reduction potential which is higher than the potential of formation reaction for forming a proton from the fuel and which is lower than the oxidation potential of a component contained in the first electrode. In this manner, the dissolution of the catalyst and the like due to fuel starvation at the first electrode can be suppressed.

In the above embodiment, the component may be one of carbon and ruthenium. Examples of the component constituting the first electrode include, in addition to carbon or ruthenium, a water repelling agent and a material containing an aid for suppressing CO poisoning. Here, the water repelling agent has an ion-exchange function and regulates the amount of water in the first electrode and in an electrolyte solution serving as a conductive medium for a proton formed at the first electrode to the electrolyte layer. Furthermore, examples of the aid for suppressing CO poisoning include magnesium, aluminum, vanadium, chromium, manganese, iron, cobalt, nickel, copper, zinc, zirconium, molybdenum, ruthenium, rhodium, palladium, tin, tungsten, iridium, and gold. Generally, platinum, and in particular platinum-supporting carbon (a catalyst in which platinum is supported on carbon), is often used as the catalyst for the production of a proton from fuel. Furthermore, in a fuel cell system in which CO poisoning is likely to occur, ruthenium is often used in addition to the platinum catalyst. Each of these two materials has an oxidation-reduction potential between the anode reaction potential and the cathode reaction potential of the fuel cell. Also in this regard, it is important to add the additive which is oxidized instead of carbon or ruthenium to the first electrode, in order to prevent the catalyst or the like from dissolving.

In the above embodiments, the additive may be a metal oxide having electrical conductivity. As used herein, the phrase "a metal oxide having electrical conductivity" refers to a metal oxide having an electrical conductivity of, for example, $10^{-10}$ S/cm or more. By employing such a metal oxide as the additive, the additive can serve as a path for electrons. Therefore, in addition to the effects in the above embodiment, an effect is obtained in which the power generation efficiency of the fuel cell can be maintained without increasing the electrical resistance of the first electrode.

In the above embodiments, the additive may be a metal oxide having acid resistance. As used herein, the acid resistance refers to a property in which the solubility in 0.5 M sulfuric acid is, for example, 1 g/dl or less. Generally, an electrolyte layer, such as a solid polymer membrane, employed in a fuel call is strongly acidic. Therefore, use of an additive which is dissolved when it comes into contact with the electrolyte layer may cause deterioration of the electrolyte layer. When an additive having acid resistance providing a solubility in 0.5 M sulfuric acid of 1 g/dl or less is used, the dissolution of the catalyst or the like can be suppressed without affecting the electrolyte layer.

Another embodiment of the present invention relates to a fuel cell system. The fuel cell system comprises: the fuel cell according to any of the above embodiments; a fuel supply unit which supplies the fuel to the first electrode; and an oxidant supply unit which supplies the oxidant to the second electrode. Hence, the dissolution of the catalyst or the like due to fuel starvation at the first electrode can be suppressed, whereby the power generation efficiency of the fuel cell system can be maintained for a long period of time.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
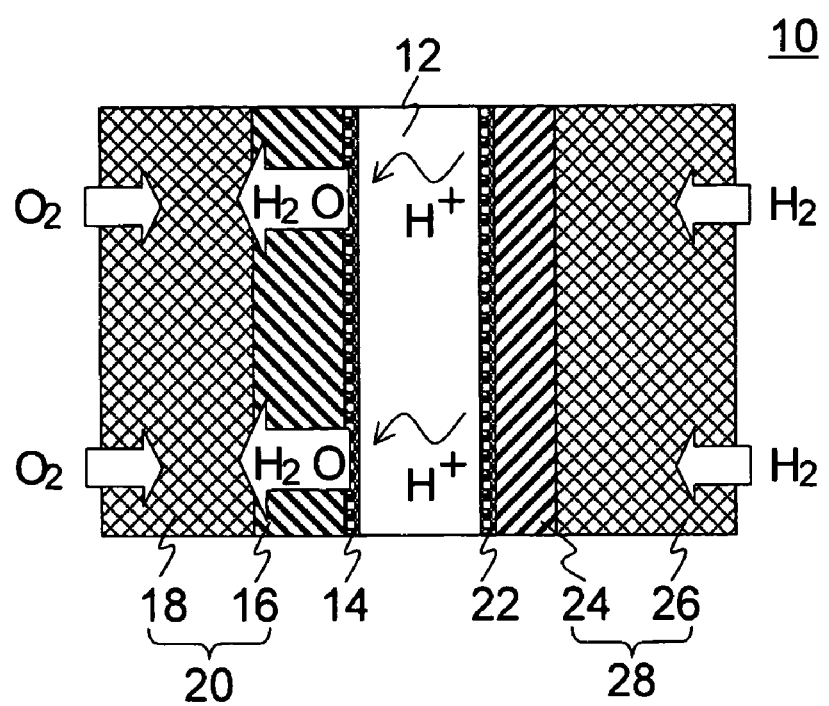
FIG. 1 is a schematic configuration diagram showing the configuration of a fuel cell according to an embodiment of the present invention.

FIG. 1 is a schematic configuration diagram showing the configuration of a fuel cell 10 according to an embodiment of the present invention. In the fuel cell according this embodiment, as a base for the diffusion layers carbon paper, carbon woven fabric, or carbon nonwoven fabric may be employed. A viscous carbon paste composed mainly of carbon black is applied to the base to thereby produce the diffusion layers. As shown in FIG. 1, the same type of carbon paper is employed as that used for the bases 18 and 26 of the diffusion layers 20 and 28, respectively, to increase production efficiency. Furthermore, a different diffusion layer paste is applied to each of the bases 18 and 26, thereby forming each of a cathode-side packed bed 16 and an anode-side packed bed 24. Specifically, the cathode-side packed bed 16 is produced by applying a diffusion layer paste to the base 18, drying the paste, and then subjecting the paste to heat treatment. In this instance, the cathode-side packed bed 16 is produced in such a manner that the water repellency (related to the amount of fluororesin) is lower than that of the anode-side packed bed 24. Furthermore, the anode-side packed bed 24 is produced by applying another diffusion layer paste to the base 26, drying the paste, and then subjecting the paste to heat treatment. In this instance, the anode-side packed bed 24 is produced in such a manner that the water repellency (related to the amount of fluororesin) is higher than that of the cathode-side packed bed 16.

However, general fluororesin (hereinafter referred to as high molecular weight fluororesin) has high binding properties. Therefore, when a large amount of high molecular weight fluororesin is added to a diffusion layer paste, the viscosity increases due to mixing and application, and the fluororesin is aggregated into clusters. Therefore, difficulty arises in the application step due to clustering of the fluororesin. Hence, a low molecular weight fluororesin is also employed which has an average molecular weight lower than that of the high molecular weight fluororesin and has very low binding properties. In this case, the low molecular weight fluororesin is responsible for water repellency, and the high molecular weight fluororesin is responsible for binding properties, whereby each of the diffusion layer pastes exhibits both suitable water repellency and binding properties in a balanced manner. Specifically, carbon paper (TGPH060H, product of Toray Industries, Inc.) serving as the base of each of the diffusion layers is immersed in a dispersion of FEP (tetrafluoroethylene-hexafluoropropylene copolymer). The immersed carbon paper is then dried at 60° C. for one hour and is subjected to heat treatment (FEP water repelling treatment) at 380° C. for 15 minutes. The above procedure is performed such that the carbon paper to FEP weight ratio is 95:5 for the cathode and 60:40 for the anode. Hence, the carbon paper is subjected to the water repelling treatment uniformly.

Next, carbon black (Vulcan XC72R, product of CABOT Corporation), terpineol (product of Kishida Chemical Co., Ltd.) serving as a solvent, and Triton (nonionic surfactant, product of Kishida Chemical Co., Ltd.) are uniformly mixed at room temperature for 60 minutes by means of a multipurpose mixer (product of DALTON CO., LTD.), thereby preparing the carbon paste. In this instance, the mixing is performed such that the weight ratio of carbon black to terpineol to Triton is 20:150:3. A low molecular weight fluororesin (LUBRON LDW40E, product of DAIKIN INDUSTRIES, Ltd.) is mixed with a high molecular weight fluororesin (PTFE30J, product of DuPont) such that the weight ratio of the fluororesins contained in the dispersion (low molecular weight fluororesin:high molecular weight fluororesin) is 20:3, thereby preparing a cathode-use mixed fluororesin. The above-prepared carbon paste is then fed into a container for use in a hybrid mixer and is cooled to 10 to 12° C. The above-prepared cathode-use mixed fluororesin is added to the cooled carbon paste such that the weight ratio of the carbon paste to the cathode-use mixed fluororesin (the fluororesin components contained in the dispersion) is 31:1. The mixture is then mixed for 12 to 18 minutes by means of a hybrid mixer (EC500, product of KEYENCE CORPORATION) using a mixing mode. The mixing is terminated when the temperature of the paste reaches 50 to 55° C., and the mixing time is adjusted as appropriate. After the temperature of the paste reaches 50 to 55° C., the mode of the hybrid mixer is switched from mixing mode to degassing mode, and degassing is performed for 1 to 3 minutes. After degassing the paste is allowed to cool, and thus the preparation of the cathode-use diffusion layer paste is complete.

The above-prepared carbon paste and the above-mentioned low molecular weight fluororesin (hereinafter referred to as an anode-use fluororesin) are fed to a container for a hybrid mixer such that the weight ratio of the carbon paste to the low molecular weight fluororesin (the fluororesin component contained in the dispersion) is 26:3. The mixture is mixed for 15 minutes by means of a hybrid mixer using a mixing mode. After mixing, the mode of the hybrid mixer is switched from mixing mode to degassing mode, and degassing is performed for 4 minutes. When a supernatant is present in the upper portion of the paste after degassing, the supernatant is discarded. Then, the paste is allowed to cool, and thus the preparation of the anode-use diffusion layer paste is complete. Each of the diffusion layer pastes cooled to room temperature is applied to the surface of the above-prepared carbon paper subjected to the FEP water repelling treatment such that a uniformly applied state is obtained on the surface of the carbon paper. Then, the diffusion layer paste is dried at 60° C. for 60 minutes by means of a hot air dryer (product of Thermal Co., Ltd). Finally, heat treatment is performed at 360° C. for 2 hours, and thus the diffusion layer is complete.

In each of the following Examples, a catalyst paste containing a catalyst suitable for each of the fuel cell systems is applied to the water management layers 16 and 24 formed on the diffusion layers 20 and 28, respectively, thereby producing a cathode 14 and an anode 22. Platinum (Pt), platinum-supporting carbon (Pt/C), or the like is generally used as the catalyst. The catalyst is mixed with a water repellant agent, a binding agent, and an electrolyte solution such as a Nafion (registered trademark) solution, thereby preparing the catalyst paste.

EXAMPLE 1

Figure 2:
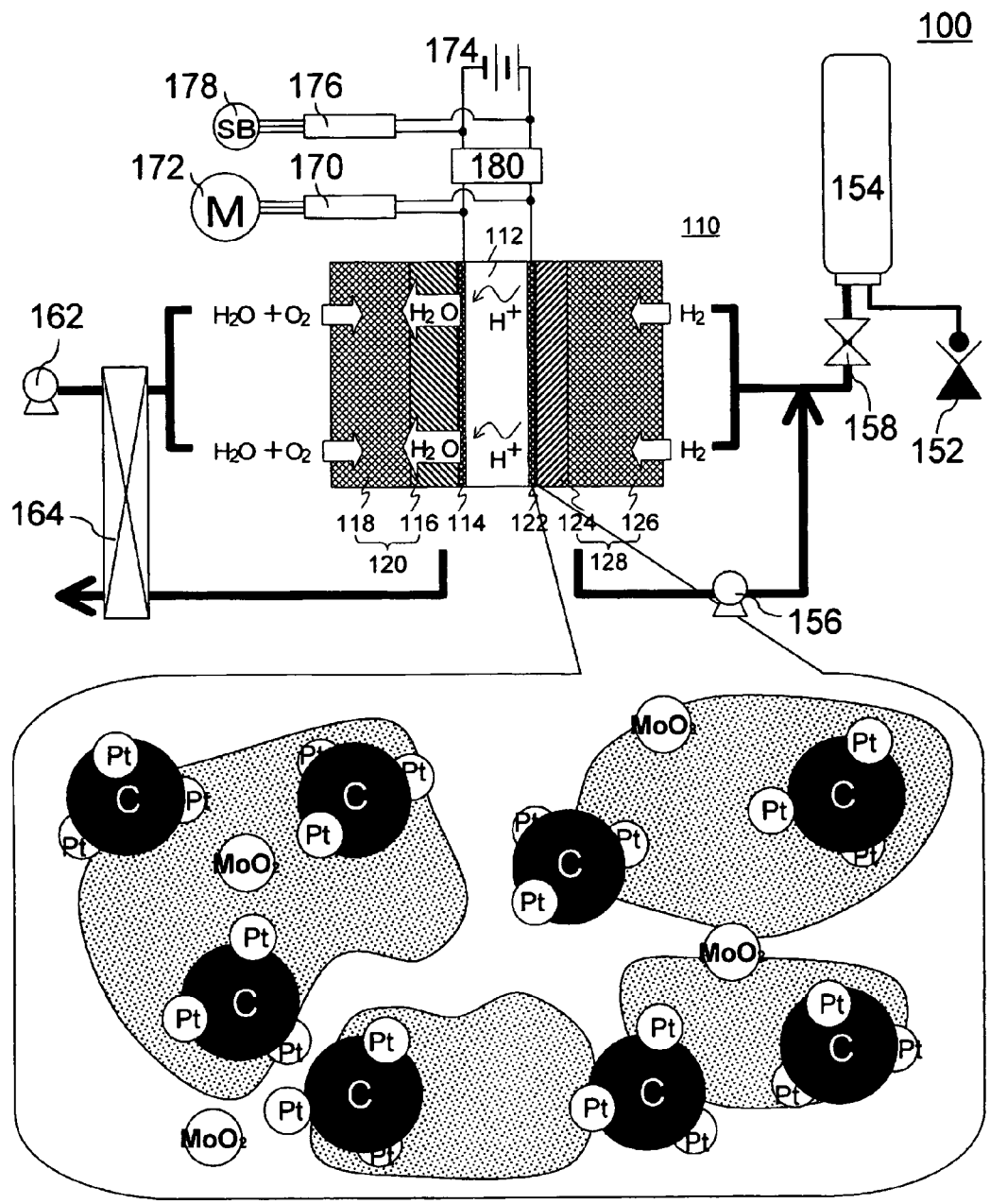
FIG. 2 is a schematic configuration diagram showing the configuration of a vehicle-mounted fuel cell system according Example 1 of the present invention.

In this Example, a description is given, with reference to FIG. 2, of a polymer electrolyte fuel cell 110 employed in a vehicle-mounted fuel cell system 100. In the vehicle-mounted fuel cell system 100, pure hydrogen is stored in a high-pressure hydrogen tank 154 from the outside through a hydrogen filling port 152 and is supplied to an anode 122 as fuel. Furthermore, the fuel not involved in power generation at the anode 122 is discharged from the fuel cell 110 and is resupplied to the anode 122 by means of a hydrogen pump 156. A pressure regulator 158 is provided in a fuel supply passage connecting the high-pressure hydrogen tank 154 to the fuel cell 110. The pressure regulator 158 regulates the pressure of the fuel supplied from the high-pressure hydrogen tank 154 to the fuel cell 110 and prevents the circulating fuel discharged from the fuel cell 110 from back-flowing to the high-pressure hydrogen tank 154.

Air from outside to the fuel cell system 100 is compressed by an air compressor 162 and is then supplied to a cathode 114. At this time, the compressed air is heat-exchanged with discharge air discharged from the cathode 114. In the present fuel cell 110, water is generated at the cathode 114 during power generation. Therefore, a so-called total enthalpy heat exchanger is employed as a heat exchanger 164. The total enthalpy heat exchanger is capable of exchanging both sensible heat and latent heat and also serves as a humidifying unit on the cathode 114 side. The electrical power generated by the fuel cell 110 is supplied to the motor 172 of an automobile through an inverter 170, and thus the fuel cell 110 serves as a driving source for the automobile. However, in order to cope with the load at the time of starting the automobile or in order to cope with abrupt load changes, a secondary battery 174 and the like is generally connected to the fuel cell 110, and a hybrid system composed of the fuel cell 110 and the secondary battery 174 is formed.

In a conventional fuel cell, platinum-supporting carbon (Pt/C) in which platinum (Pt) serving as a catalyst is supported on carbon (C) is mixed with an electrolyte solution (5% Nafion (registered trademark) solution) to thereby prepare a catalyst paste. This catalyst paste is applied to an anode-side water management layer 124 formed by applying an anode-use diffusion layer paste to an anode-side diffusion layer 128, thereby forming an anode 122. However, in the fuel cell 110 of Example 1, a catalyst paste is prepared by mixing the electrolyte solution with a mixture of Pt/C and a molybdenum oxide such as $MoO$, $MoO_2$, or $MoO_3$ (where the weight ratio of Pt/C to $MoO_2$ is 5:1). When the amount of the molybdenum oxide exceeds 25% of the amount of the catalyst (Pt/C), the amount of the catalyst contained in the anode 122 decreases, and thus the reaction efficiency at the electrode is reduced. Furthermore, when the amount of the molybdenum oxide is less than 1% of the amount of the catalyst (Pt/C), the molybdenum oxide is utilized and exhausted soon after fuel starvation occurs at the anode 122, and thus the effect of the molybdenum oxide does not last for long. Therefore, it is desirable that the molybdenum oxide be mixed in an amount in the range of 1 to 25% of the amount of the catalyst.

Figure 3:
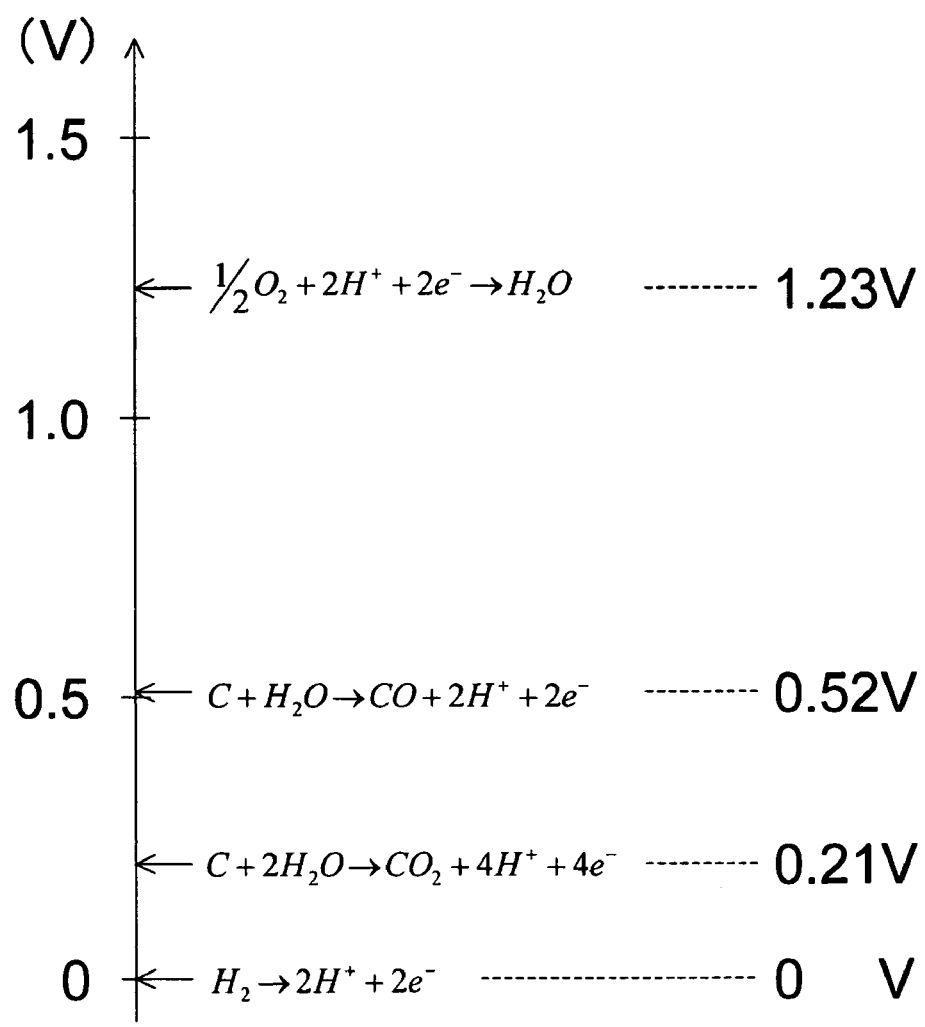
FIG. 3 is a graph showing the oxidation-reduction potential of the reactions occurring in a fuel cell according to Example 1 of the present invention.

FIG. 3 is a graph showing the potential of the anode reaction, the potential of the cathode reaction, and the oxidation potentials of carbon. When fuel starvation occurs in the fuel cell 110 employing Pt/C at the anode 122, reactions to extract electrons in which hydrogen ions are produced from C and $H_2O$ are more likely to occur instead of the anode reaction, as shown in FIG. 3. When C dissolves, Pt supported on the C is released, and thus the reaction efficiency of the anode 122 is significantly reduced. Therefore, as described above, a molybdenum oxide is mixed with the catalyst paste which forms the anode 122. The oxidation potential of the molybdenum oxide in the fuel cell 110 is −0.05 V to 0.30 V (see p. 479 of A. J. Bard, R. Parsons, J. Jordan, Eds., "Standard Potential in Aqueous Solution", Marcel Dekker (1985)). Thus, the oxidation potential of the molybdenum oxide is lower than the oxidation potential of C. Therefore, when fuel starvation occurs at the anode 122, the molybdenum oxide mixed in the anode 122 is transformed to another molybdenum oxide having a higher oxidation number before the carbon oxidation reactions represented by equations (3) and (4) occur.

Therefore, even when fuel starvation occurs at the anode 122, the reactions represented by equations (3) and (4) do not occur. Thus, the problem of the release of C as $CO_2$ from the anode 122 can be avoided, and the amount of the catalyst (Pt) supported on C does not decrease. As described above, the additive for reducing the effect of fuel starvation may be any material having an oxidation-reduction potential of 0 V or more and 0.52 V or less in the internal environment of the fuel cell 110 (in this Example, the hydrogen ion exponent is −0.5<pH<1). Desirably, the additive has an oxidation-reduction potential in the range of 0 V to 0.21 V. Molybdenum oxides have excellent electrical conductivity. In particular, $MoO_2$ and $MoO_3$ are readily available and thus are suitable as the additive mixed in the anode 122 for reducing the effect of fuel starvation. Furthermore, in this Example (FIG. 2), $MoO_2$ is mixed with Pt/C to prepare the catalyst paste. However, since Mo interacts electronically with Pt, a $MoO_2$Pt/C catalyst may be employed in which $MoO_2$ is also supported on C (preferably, Pt is not supported on $MoO_2$). By supporting $MoO_2$ on C, the catalysis of Pt can be improved.

EXAMPLE 2

Figure 4:
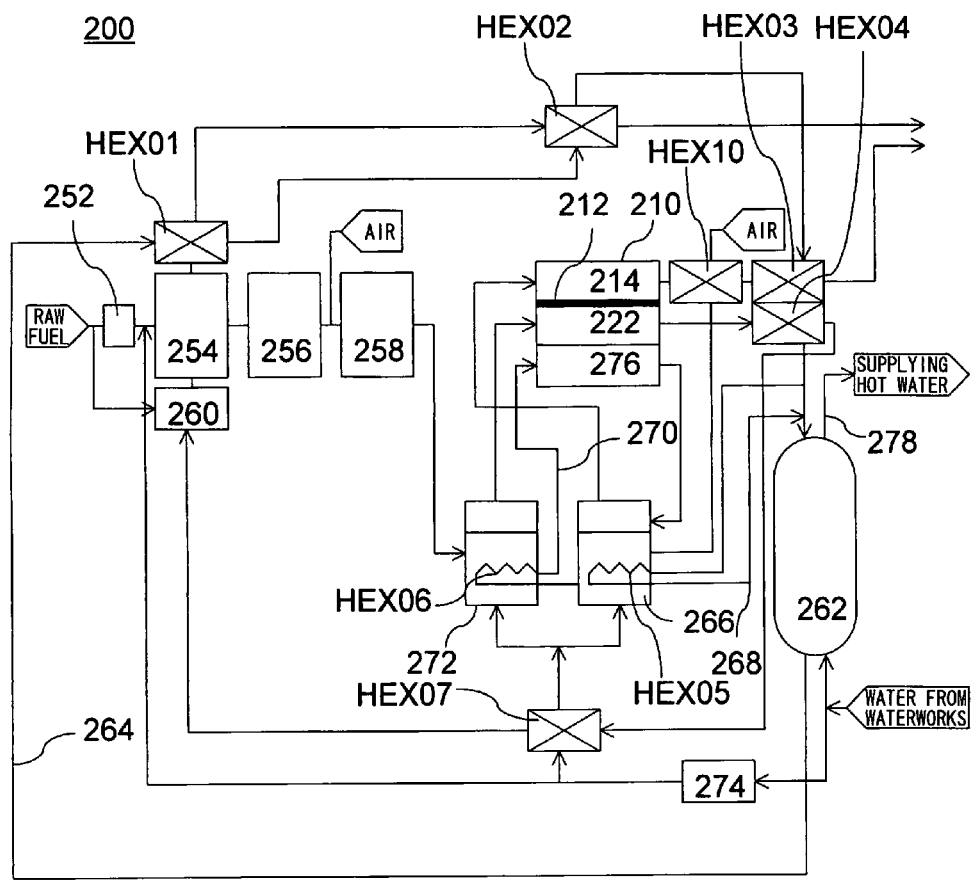
FIG. 4 is a schematic configuration diagram showing the configuration of a domestic-use fuel cell co-generation system according to Example 2 of the present invention.

In this Example, a description is given, with reference to FIG. 4, of a fuel cell 210 employed in a domestic-use fuel cell co-generation system 200. The domestic-use fuel cell co-generation system 200 comprises: a reforming apparatus which reforms raw fuel (being a hydrocarbon-based fuel) such as LPG or city gas and generates reformed gas containing hydrogen (fuel) in an amount of approximately 80%; the fuel cell 210 which generates electrical power using the reformed gas supplied from the reforming apparatus and oxygen in air (being the oxidant); and a hot water storage apparatus which recovers and stores heat generated in the reforming apparatus and the fuel cell 210 in the form of hot water (water of 40° C. or higher). Thus, this system has both a power generation function and a hot water supplying function.

Generally, as a safety measure in the case of a gas leak, an odor is added to the raw fuel, such as LPG or city gas, being supplied to homes, with sulfide being often used for this purpose. However, the sulfide deteriorates the catalyst in the reforming apparatus. Thus, in the reforming apparatus, the sulfide in the raw fuel is first removed by means of a desulfurizer 252. The raw fuel desulfurized by means of the desulfurizer 252 is then mixed with water vapor. The mixture is subjected to water vapor reforming by means of a reformer 254 and is introduced to a transformer 256. A reformed gas containing approximately 80% of hydrogen, approximately 20% of carbon dioxide, and 1% or less of carbon monoxide is generated by means of the transformer 256. However, in the present system 200, the reformed gas is supplied to the fuel cell 210 which operates at low temperatures (100° C. or lower) where the cell is more likely to be affected by carbon monoxide. Therefore, the reformed gas is mixed with oxygen to selectively oxidize carbon monoxide by means of a CO remover 258. By means of the CO remover 258, the carbon monoxide concentration in the reformed gas can be reduced to 10 ppm or less.

The reforming apparatus includes at least the reformer 254 and the transformer 256. As in the present system 200, when the gas supplied to homes is employed as raw fuel, the reforming apparatus further includes the desulfurizer 252. Furthermore, when a low temperature type fuel cell such as a polymer electrolyte fuel cell is employed as the fuel cell 210, the reforming apparatus further includes the CO remover 258.

Since the water vapor reformation is an endothermic reaction, a burner 260 is provided in the reformer 254. At the startup of the reforming apparatus, the raw fuel is also supplied to the burner 260 to raise the temperature of the reformer 254. Once the present system 200 is operating stably, the raw fuel supplied to the burner 260 is terminated, and unreacted fuel discharged from the fuel cell 210 is supplied to the burner 260, whereby heat is supplied to the reformer 254. Since the discharge gas having supplied heat to the reformer 254 through the burner 260 still carries a large amount of heat, the discharge gas is subjected to heat exchange with water in a hot water storage tank 262 by means of heat exchangers HEX01 and HEX02. Then, this water is subjected to heat exchange with a discharge gas from a cathode 214 of the fuel cell 210 by means of a heat exchanger HEX03. The water is further subjected to heat exchange with a discharge gas from an anode 222 by means of a heat exchanger HEX04 and then returns to the hot water storage tank 262. In order to utilize the temperature of the water (hot water) having passed through the heat exchanger HEX04 for heating or cooling a cathode-side humidification tank 266, a branched tube 268 is provided in a water tube 264 passing through the heat exchangers HEX01 to HEX04. At the time of, for example, startup of the present system 200, the temperature of the cathode-side humidification tank 266 is low. In such a case, the water having passed through the heat exchanger HEX04 passes through the branched tube 268. Then, at the heat exchanger HEX05, the water supplies heat to the cathode-side humidification tank 266 and returns to the hot water storage tank 262.

This cathode-side humidification tank 266 also serves as a cooling water tank, and the water in this humidification tank 266 cools the fuel cell 210 and returns to the tank 266. As described above, the temperature of the fuel cell 210 is low at the time of, for example, startup of the present system 200, and thus the fuel cell 210 can be warmed by supplying thereto the cooling water warmed by the heat exchanger HEX05. Furthermore, a cooling water passage 270 through which the cooling water flows is connected to a heat exchanger HEX06 provided in an anode-side humidification tank 272. The cooling water also plays a role in approximately matching the temperature of the cathode-side humidification tank 266 with the temperature of the anode-side humidification tank 272.

The reformed gas from the reforming apparatus is humidified (bubbled, in the case of the present system 200) in this anode-side humidification tank 272 and is supplied to the anode 222. The unreacted fuel not involved in power generation at the anode 222 is discharged from the fuel cell 210 and is supplied to the burner 260. Normally, the fuel cell 210 is operated so as to generate electrical power in the range of 70 to 80° C. Since the discharge gas discharged from the fuel cell 210 has a temperature of approximately 80° C., the discharge gas is subjected to heat exchange in the heat exchanger HEX04 as described above. Subsequently, in a heat exchanger HEX07, the discharge gas raises the temperature of water to be supplied to the cathode-side humidification tank 266 and the anode-side humidification tank 272 and is then supplied to the burner 260.

Desirably, the water supplied to the cathode-side humidification tank 266 and the anode-side humidification tank 272 is purified water having low electrical conductivity and containing only a small amount of organic materials. Therefore, water from the public waterworks is subjected to water treatment by means of a water treatment apparatus 274 by use of a reverse osmosis membrane and ion-exchange resin, and this treated water is employed as the water to be supplied. Furthermore, the water subjected to water treatment is also employed for water vapor reforming by means of the reformer 254. The water from the public waterworks is also supplied to the hot water storage tank 262. At this time, the water from the public waterworks is supplied to this storage tank 262 at a lower portion thereof. The water tube 264 draws low temperature water from the lower portion of this storage tank 262 and returns water subjected to heat exchange in each of the heat exchangers to an upper portion of the storage tank 262.

Reference numeral HEX10 represents a total enthalpy heat exchanger. The discharge gas containing unreacted oxygen not involved in power generation at the cathode 214 has a temperature of approximately 80° C. and contains water generated through reactions at the cathode 214. Thus, in the total enthalpy heat exchanger HEX10, the discharge gas supplies heat and moisture to air to be supplied to the cathode 214. The air to be supplied to the cathode 214 is humidified (bubbled, in the case of the present system 200) in the cathode-side humidification tank 266 and is then supplied to the cathode 214. Furthermore, the discharge gas having been supplied both heat and moisture by means of the total enthalpy heat exchanger HEX10 is further subjected to heat exchange with water by means of the heat exchanger HEX03 and is discharged to outside the present system 200.

In a conventional fuel cell, a platinum-ruthenium-supporting carbon (Pt—Ru/C) in which platinum (Pt) and ruthenium (Ru) serving as the catalyst are supported on carbon (C) is mixed with an electrolyte solution (5% Nafion (registered trademark) solution) to thereby prepare a catalyst paste. This catalyst paste is applied to an anode-side water management layer 224 formed by applying an anode-use diffusion layer paste to an anode-side diffusion layer 228, thereby forming the anode 222. However, in the fuel cell 210 of this Example, a catalyst paste is prepared by mixing the electrolyte solution with a mixture of Pt—Ru/C and a tungsten oxide such as $WO_2$, $W_2O_5$, or $WO_3$ (where the weight ratio of Pt—Ru/C to $WO_2$ is 5:1). As in Example 1, when the amount of the tungsten oxide exceeds 25% of the amount of the catalyst (Pt—Ru/C), the amount of the catalyst contained in the anode 222 decreases, and thus the reaction efficiency at the electrode is reduced. Furthermore, when the amount of the tungsten oxide is less than 1% of the amount of the catalyst (Pt—Ru/C), the tungsten oxide is utilized and exhausted soon after fuel starvation occurs at the anode 222, and thus the effect of the tungsten oxide does not last for long. Therefore, it is desirable that the tungsten oxide be mixed in an amount in the range of 1 to 25% of the amount of the catalyst.

Figure 5:
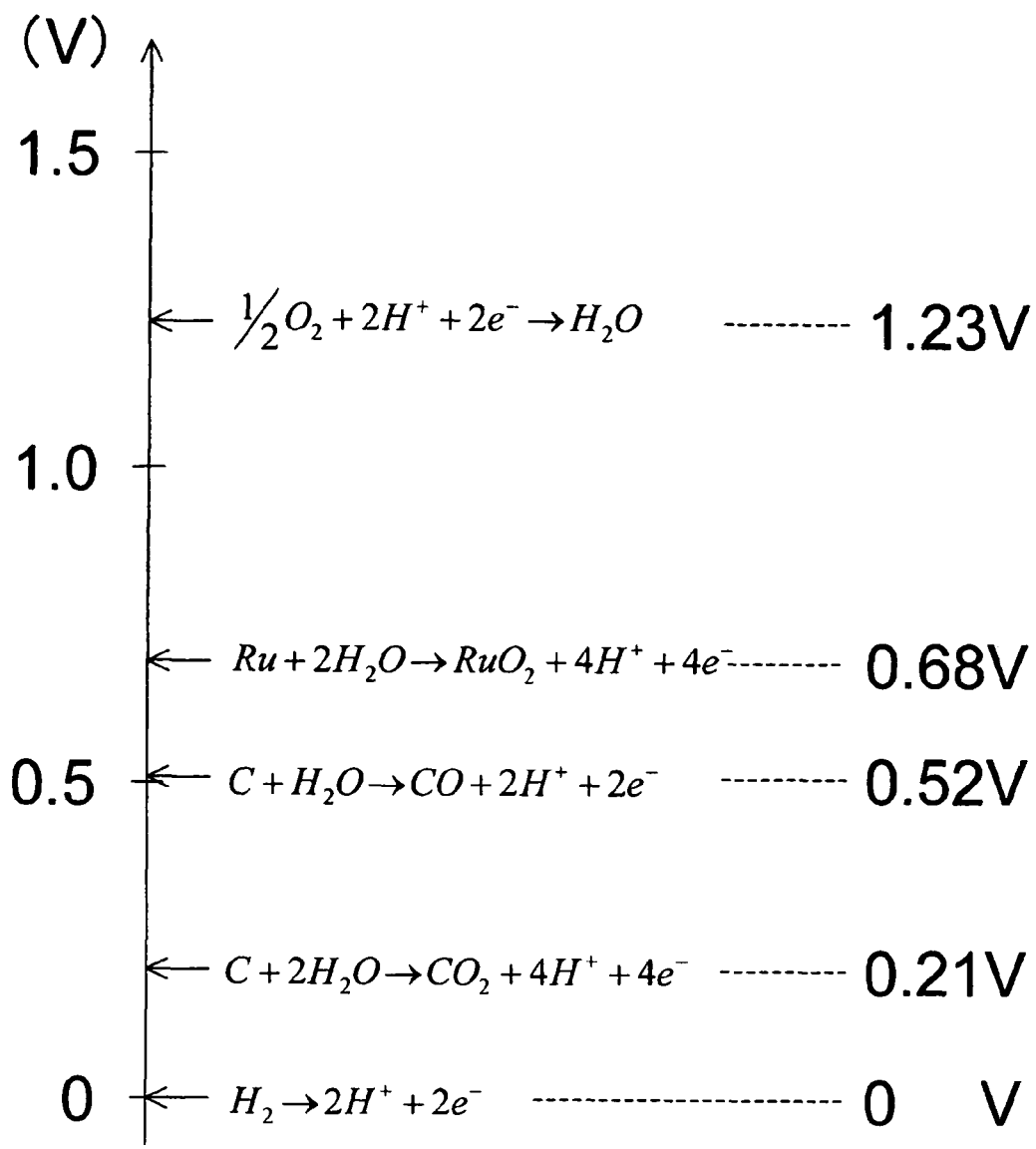
FIG. 5 is a graph showing the oxidation-reduction potential of the reactions occurring in a fuel cell according to Example 2 of the present invention.

FIG. 5 is a graph showing the potential of the anode reaction, the potential of the cathode reaction, the oxidation potentials of carbon, and the oxidation potential of ruthenium. As shown in FIG. 5, when fuel starvation occurs in the fuel cell 210 employing Pt—Ru/C at the anode 222, reactions to extract electrons in which hydrogen ions are produced from C and $H_2O$ are more likely to occur instead of the anode reaction. At the same time, a reaction is more likely to occur in which electrons are removed from Ru to produce $Ru2^+$ and thus Ru is oxidized and dissolved. When C dissolves, Pt and Ru supported on the C are released, and thus the reaction efficiency of the anode 222 is significantly reduced. Furthermore, when Ru is oxidized and dissolved, the CO resistance of the anode 222 is significantly reduced. Therefore, as described above, a tungsten oxide is mixed with the catalyst paste which forms the anode 222. The oxidation potential of the tungsten oxide in the fuel cell 210 is –0.03 V to 0.30 V (see p. 282 of Pourbaix). Thus, the oxidation potential of the tungsten oxide is lower than the oxidation potential of C and Ru. Therefore, when fuel starvation occurs at the anode 222, the tungsten oxide mixed in the anode 222 is transformed into another tungsten oxide having a higher oxidation number before the carbon and Ru oxidation reactions represented by equations (3), (4), and (5) occur.

Therefore, even when fuel starvation occurs at the anode 222, the reactions represented by equations (3), (4), and (5) do not occur. Thus, the problem of the release of C as $CO_2$ from the anode 222 can be avoided, and the problem of oxidation and dissolution of Ru as $Ru^{2+}$ can also be avoided. Hence, the amount of the catalysts (Pt and Ru) supported on the C does not decrease, thereby preventing the reaction efficiency and the CO resistance of the anode 222 from being reduced. As described above, the additive for reducing the effect of fuel starvation may be any material having an oxidation-reduction potential in the range of 0 V to 0.68 V in the internal environment of the fuel cell 210 (in the present example, the hydrogen ion exponent is –0.5<pH<1). Desirably, the additive has an oxidation-reduction potential the range of 0 V to 0.52 V, and more preferably in the range of 0 V to 0.21 V. Tungsten oxides are insoluble in water and hardly soluble in acid and are readily available. Therefore, tungsten oxides are suitable as the additive to be mixed with the anode 222 to reduce the effect of fuel starvation.

In this Example, the reformed gas discharged from the reforming apparatus (the CO remover 258) is supplied to the anode 222 through the anode-side humidification tank 272, as described above. However, the reformed gas contains CO, and it has been found that the power generation performance of the fuel cell 210 is significantly reduced when CO reacts with stainless steel (containing Fe, Ni) employed in the reforming apparatus and pipes to generate iron carbonyl and nickel carbonyl. Hence, although not shown in FIG. 4, a carbonyl trapping apparatus may be provided upstream from the anode-side humidification tank 272. Examples of the carbonyl trapping apparatus include: a filter containing an alumina porous material and an oxidant such as $KMnO_4$, $K_2Cr_2O_7$, $NaBrO_3$, or $KBrO_3$; and a tank in which the reformed gas is bubbled in a solution prepared by dissolving the above oxidant.

EXAMPLE 3

Figure 6:
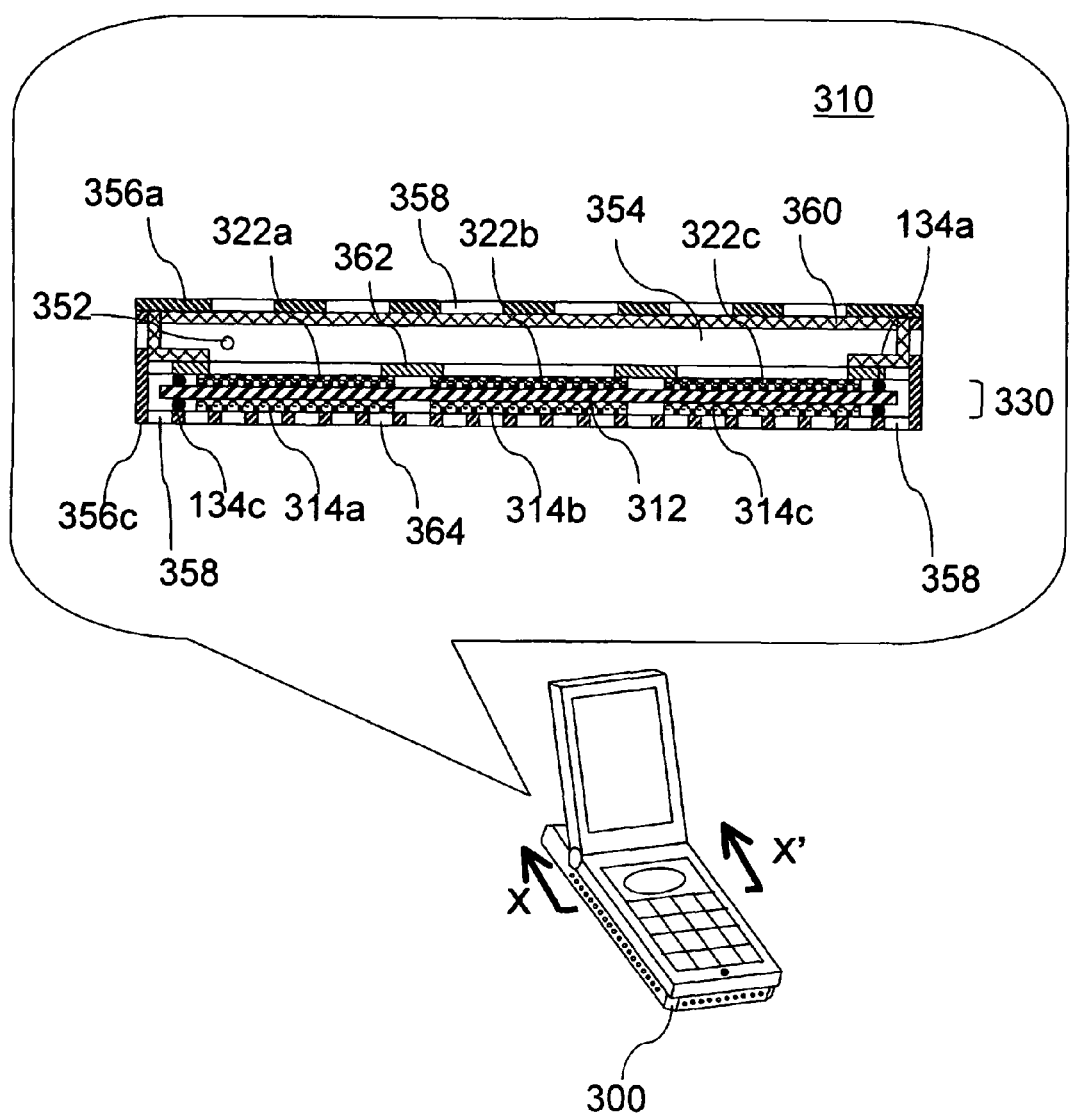
FIG. 6 is a schematic configuration diagram showing the configuration of a portable fuel cell system according to Example 3 of the present invention.

In this Example, a description is given, with reference to FIG. 6, of a fuel cell 310 employed in a mobile-use fuel cell system 300. The fuel cell 310 is a direct methanol fuel cell (DMFC) in which an aqueous solution of methanol or pure methanol (hereinafter referred to as "methanol fuel") is supplied to the anodes 322. The fuel cell 310 includes a catalyst-coated membrane (CCM) 330 serving as a power generation unit. The CCM 330 is formed by sandwiching a solid polymer membrane 312 between cathodes 314 and the anodes 322 without using a cathode-side diffusion layer 320 or an anode-side diffusion layer 328.

The methanol fuel to be supplied to the anodes 322 is supplied to the fuel chambers 354 from outside the fuel cell system 310 through a methanol fuel supply hole 352. The fuel chambers 354 are in communication with each other, and the methanol fuel stored in the fuel chambers 354 is supplied to the respective anodes 322. At the anodes 322, the reaction of methanol occurs as represented by equation (2). Furthermore, $H^+$ moves to the cathodes 314 through the solid polymer membrane 312, and thus electrical power may be drawn off. As is clear from equation (2), carbon dioxide is generated at the anodes 322 through this reaction. Thus, a gas-liquid separation filter 360 is placed between the fuel chambers 354 and the anode-side product discharge holes 358 provided in an anode-side case 356a of the fuel cell 310.

This gas-liquid separation filter 360 is a planar filter having fine holes which selectively pass gas components therethrough and do not allow liquid components to pass therethrough. A material having methanol (alcohol) resistance is suitable as the material for this filter. Furthermore, a light weight material having sufficient stiffness and corrosion resistance is suitable as the material used to form the case 356. Examples of suitable material include a synthetic resin and metals such as an aluminum alloy, a titanium alloy, and stainless steel. Additionally, tempered glass or a skeleton resin may also be employed. As in the gas-liquid separation filter 360, the case 356 has a portion contacting the methanol fuel. Thus, preferably, a composite material formed by overlaying a fluorine-based synthetic resin onto the above synthetic resin or metal is employed, in particular in the portion contacting the methanol fuel. Furthermore, a support member 362 forms the fuel chambers 354 and tightens the CCM 330. Preferably, a material the same as that used for the portion contacting the methanol fuel in the case 356 is employed for the support member 362.

Air is supplied to the cathodes 314 through cathode-side product discharge holes 364. Oxygen in the supplied air reacts with $H^+$ arriving at the cathodes 314 through the solid polymer membrane 312 to thereby form product water. The cathode-side product discharge holes 364 supply air to the cathodes 314 and discharge the product water formed at the cathodes 314. These cathode-side holes 364 are provided such that the total area thereof is the same as the total area of the anode-side product discharge holes 358. However, the number of the cathode-side holes 364 is larger than the number of the anode-side holes 358, and the diameter of the cathode-side holes 364 is smaller than that of the anode-side holes 358. Moreover, the inner wall of the cathode-side product discharge holes 364 is coated with a functional coating material containing a photocatalyst such as titanium oxide. In addition to this, the surface of a portion of a cathode-side case 356c, being the portion that has these holes 364 provided therein, is coated with this functional coating material. The product water discharged from the cathodes 314 is prevented from dripping by provision of a large number of small holes. Furthermore, by coating the inner wall with the functional coating material, the product water spreads thinly over the surface of the inner wall without clogging the holes. Thus, the evaporation of the product water is facilitated, and breeding of microorganisms or the like can be prevented.

Preferably, this functional coating material contains a metal such as silver, copper, or zinc in order to provide an organic material decomposition function and an antimicrobial function that are activated even when the fuel cell 310 is not irradiated with light that includes photocatalyst-activating wavelengths, as sunlight. Furthermore, when a user of the fuel cell 310 touches the fuel cell 310, organic materials may adhere to the fuel cell 310. When the entire surface of the case 356 is coated with the functional coating material, any organic materials adhered to the cell can be decomposed. In this manner, a soil resistance function or the antimicrobial function can be imparted to the fuel cell 310. In order to prevent the methanol fuel from flowing from the anodes 322 to the cathodes 314, O-rings 134 (an anode-side O-ring 134a and a cathode-side O-ring 134c) are placed so as to surround and enclose the CCM 330. In this Example, the O-rings 134 are pressed by the cathode-side case 356c and the support member 362 to prevent the methanol fuel from flowing from the anodes 322 to the cathodes 314 and to prevent oxygen from flowing into the anodes 322 as well. Desirably, the O-rings 134 are made of a material having both flexibility and corrosion resistance.

In this embodiment, Nafion 115 (product of DuPont) is employed for the solid polymer membrane 312 of the CCM 330. A cathode catalyst paste prepared by mixing Pt black with 5% Nafionc® solution (product of DuPont) is applied to one of the surfaces of the solid polymer membrane 312, thereby forming the cathodes 314. An anode catalyst paste prepared by mixing Pt—Ru black is applied to the other surface of the solid polymer membrane 312, a molybdenum oxide, and 5% Nafionc® solution (product of DuPont), thereby forming the anodes 322. At this time, a mixture of Pt—Ru black and a molybdenum oxide (the weight ratio of Pt—Ru black to $MnO_2$ is 19:1) is mixed with the electrolyte solution to thereby prepare the anode catalyst paste. In this example, a catalyst composed of Pt—Ru such as Pt—Ru black is used in place of catalyst-supporting carbon. In such a case, when the amount of the additive ($MoO_2$ in this Example) exceeds 10% of the amount of the catalyst, the amount of the catalyst contained in the anode 322 decreases, and thus the reaction efficiency at the electrode is reduced. Furthermore, as in Examples 1 and 2, when the amount of additive is less than 1% of the amount of the catalyst, the molybdenum oxide is utilized and exhausted soon after fuel starvation occurs at the anode 322, and thus the effect of the molybdenum oxide does not last for long. Therefore, it is desirable that molybdenum oxide be mixed in an amount in the range of 1 to 10% of the amount of the catalyst.

Figure 7:
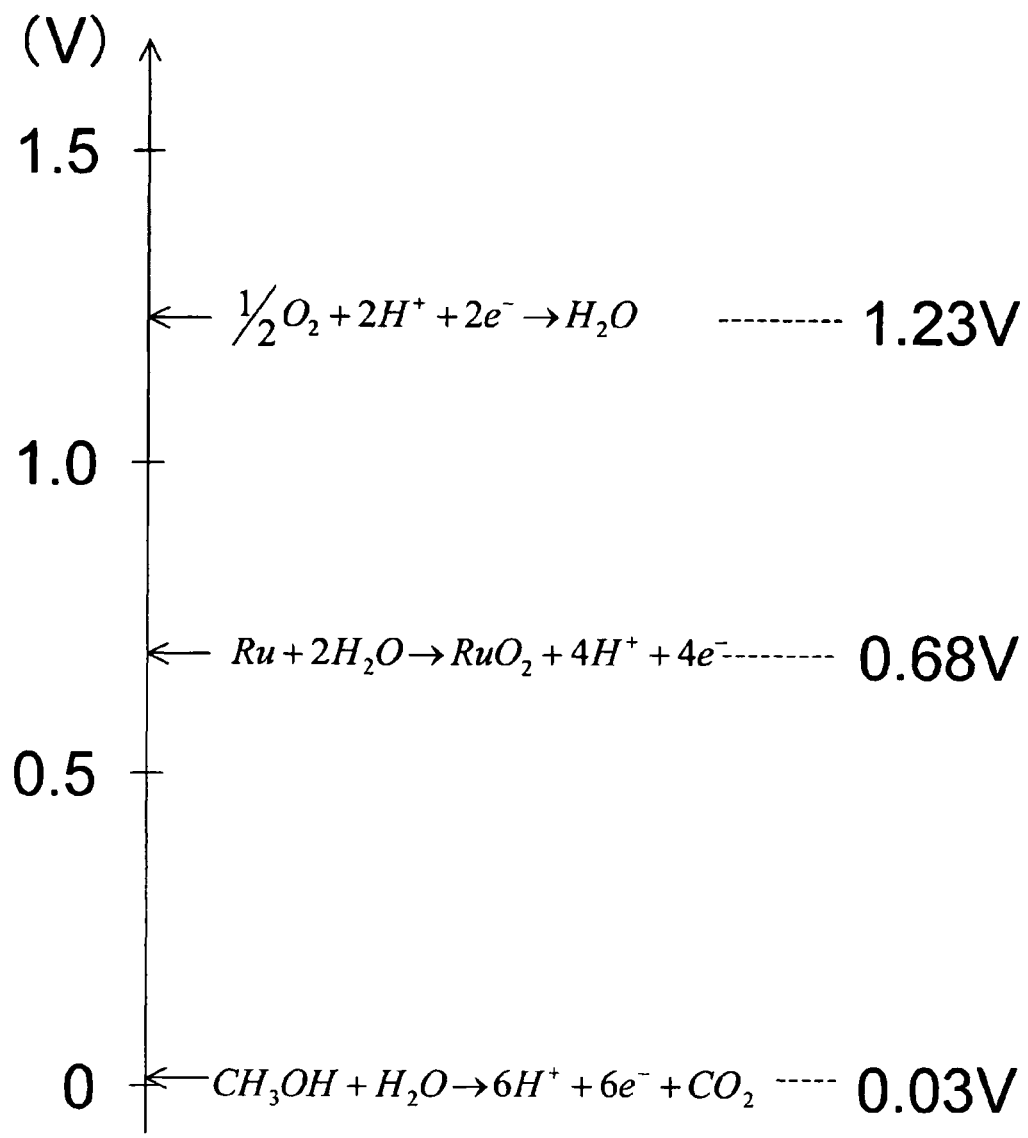
FIG. 7 is a graph showing the oxidation-reduction potential of the reactions occurring in a fuel cell according to Example 3 of the present invention.

FIG. 7 is a graph showing the potential of the anode reaction, the potential of the cathode reaction, and the oxidation potential of ruthenium in the DMFC. As shown in FIG. 7, the anode reaction potential of the present fuel cell 310 is higher than that of the fuel cells which uses $H_2$. However, when fuel starvation occurs in the fuel cell 310, the reaction in which electrons are removed from Ru to produce $Ru^{2+}$ and thus Ru is oxidized and dissolved is more likely to occur instead of the anode reaction. As represented by equation (2), $CO_2$ serving as a reaction product is generated at the anodes 322 of the fuel cell 310, and CO is also generated in the reaction process (or through an incomplete reaction). When Ru is oxidized and dissolved, the CO resistance of the anodes 322 is significantly reduced. Therefore, as described above, a molybdenum oxide is mixed with the catalyst paste which forms the anodes 322. The oxidation potential of the molybdenum oxide in the fuel cell 310 is in the range of −0.05 V to 0.30 V and is lower than the oxidation potential of Ru. Therefore, when fuel starvation occurs at the anodes 322, the molybdenum oxide mixed in the anodes 322 is transformed into another molybdenum oxide having a higher oxidation number before the Ru oxidation reaction represented by equation (5) occurs.

Therefore, even when fuel starvation occurs at the anodes 322, the reaction represented by equation (5) does not occur. Thus, the problem of oxidation and dissolution of Ru as $Ru^{2+}$ can be avoided. Hence, the CO resistance of the anodes 322 is prevented from being reduced. As described above, the additive for reducing the effect of fuel starvation in the DMFC may be any material having an oxidation-reduction potential in the range of 0.03 V to 0.68 V in the internal environment of the fuel cell 310 (in this Example, the hydrogen ion exponent is 0<pH<2.5). Molybdenum oxides have excellent electrical conductivity and are insoluble in water and in dilute acid. Furthermore, molybdenum oxides are readily available and are thus suitable as the additive mixed in the anodes 322 to reduce the effect of fuel starvation.

In this Example, Nafion 115 is employed as the solid polymer membrane 312. However, the solid polymer membrane 312 may be any electrolyte layer having ionic conductivity and a thickness in the range of 50 to 200 μm. In the case of a DMFC which uses methanol fuel as the fuel as in this Example, it is more desirable that the solid polymer membrane 312 be an electrolyte layer capable of suppressing the occurrence of a so-called cross leak phenomenon in which methanol passes through the solid polymer membrane 312 and moves to the cathode side. Furthermore, in the present method, the cathodes 314 and the anodes 322 are formed on the solid polymer membrane 312. However, a method or a configuration may be employed in which a catalyst layer is formed on an electrode base such as carbon paper as in Examples 1 and 2. Furthermore, in addition to the particles composed of Pt—Ru or Pt (Pt—Ru black or Pt black), any catalyst-supporting carbon in which a catalyst is supported on carbon may be employed so long as the catalyst provides catalysis for producing $H^+$ from methanol or water from $H^+$ and oxygen.

In the present embodiments, a description has been given of a vehicle-mounted fuel cell system, a domestic-use fuel cell co-generation system, and a portable fuel cell system. The problems caused by fuel starvation in these fuel cells can arise in a system other than the above systems. Therefore, the present invention is not limited to the above systems but can be utilized in all fuel cells which generate electrical power through the electrochemical reaction of a hydrogen source with an oxygen source. Molybdenum oxides and tungsten oxides have both been described as an example of the additive to reduce the effect of fuel starvation. However, as described in the above detailed examples, the additive for reducing the effect of fuel starvation may be any material having an oxidation-reduction potential which lies between the anode reaction potential and the cathode reaction potential and which is lower than the oxidation potential of a material employed on the anode side (a component of the anode). Thus, in addition to the materials used in the above Examples, ruthenium oxide, tungsten carbide, or the like may be used. Furthermore, operation in a fuel starvation condition is likely to cause the deterioration of a cathode catalyst. Therefore, by adding an additive for coping with fuel starvation as in the present invention, the deterioration of the cathode catalyst can also be prevented.

What is claimed is:

1. A fuel cell, comprising:
    an electrolyte layer;
    a first electrode which is provided on one surface of the electrolyte layer and to which fuel is supplied; and
    a second electrode which is provided on the other surface of the electrolyte layer and to which an oxidant is supplied, wherein
    the first electrode contains:
    a catalyst-supporting carbon or a catalyst containing ruthenium; and
    an additive having an oxidation-reduction potential which is higher than a potential of formation reaction for forming a proton from the fuel and which is lower than an oxidation potential of the catalyst-supporting carbon or ruthenium,
    the additive is a metal oxide that does not support the catalyst, and
    the metal oxide is mixed with the catalyst-supporting carbon or the catalyst containing ruthenium.

2. The fuel cell according to claim 1, wherein
    the additive is molybdenum oxide,
    the catalyst containing ruthenium is platinum-ruthenium black, and
    the amount of the molybdenum oxide is in the range of 1 to 10 weight percent of the amount of the platinum-ruthenium black.

3. The fuel cell according to claim 1, wherein
    the additive is molybdenum oxide,
    the catalyst-supporting carbon is platinum-supporting carbon, and
    the amount of the molybdenum oxide is in the range of 1 to 25 weight percent of the amount of the platinum-supporting carbon.

4. The fuel cell according to claim 1, wherein the additive is tungsten oxide, the catalyst-supporting carbon is platinum-ruthenium-supporting carbon, and the amount of the tungsten oxide is in the range of 1 to 25 weight percent of the amount of the platinum-ruthenium-supporting carbon.

* * * * *